United States Patent [19]

Goodrich

[11] Patent Number: 5,288,779
[45] Date of Patent: Feb. 22, 1994

[54] POLYURETHANEUREA SOLUTIONS AND SPANDEX THEREFROM

[75] Inventor: Charles W. Goodrich, Waynesboro, Va.

[73] Assignee: E. I. Du Pont de Nemours and Company, Wilmington, Del.

[21] Appl. No.: 785,657

[22] Filed: Oct. 31, 1991

[51] Int. Cl.$^5$ ............ C08J 3/20; C08K 5/49; C08L 75/02; C08G 18/08
[52] U.S. Cl. .................. 524/121; 524/126; 528/51
[58] Field of Search ............ 524/121, 126; 528/51

[56] References Cited

U.S. PATENT DOCUMENTS

| | | | |
|---|---|---|---|
| 3,726,836 | 4/1973 | Nakahara et al. | 260/75 |
| 3,939,111 | 2/1976 | Schollenberger et al. | 260/32.6 |
| 4,075,163 | 2/1978 | Hofer et al. | 260/45.7 |
| 4,548,975 | 10/1985 | Lewis | 524/147 |
| 4,677,154 | 6/1987 | Narayan et al. | 524/710 |
| 4,877,825 | 10/1989 | Kausch et al. | 524/101 |

*Primary Examiner*—Paul R. Michl
*Assistant Examiner*—Patrick Niland

[57] ABSTRACT

Certain 4,4'-biphenylene diphosphonites in solutions of polyurethaneurea polymer, in concentrations of 0.05 to 1.5% based on dry polymer weight, protect the solutions from undesired changes in solution viscosity.

6 Claims, No Drawings

POLYURETHANEUREA SOLUTIONS AND SPANDEX THEREFROM

BACKGROUND OF THE INVENTION

1. Field of the Invention

This invention relates to a polyurethaneurea solution that is protected against changes in viscosity and to spandex dry spun therefrom. More particularly, the invention concerns such a solution containing a small amount of a specific 4,4'-biphenylene diphosphonite.

2. Description of the Prior Art

Polyurethaneureas are prepared by reacting a hydroxyl-terminated linear polymer, such as a polyether glycol or a polyester glycol, with an organic diisocyanate to form a prepolymer, which is then chain-extended with a diamine. Usually, the reactions are conducted in an inert organic solvent. The solutions are suited for dry spinning into spandex. However, to produce spandex with consistent properties, the solutions should be of constant viscosity. Fluctuations or changes in solution viscosity during storage, processing or dry spinning can result in variations in threadline tension, difficulties in winding and unwinding, and various non-uniformities in elastic properties of the spandex.

Several methods have been suggested to control polyurethaneurea solution viscosity. However, each has shortcomings. For example, Nakahara et al, U.S. Pat. No. 3,726,836 discloses use of an N,N-dialkylhydrazine as a polymer chain terminator and subsequent heat-aging to stabilize polyurethane solutions against gelation. However, such chain terminators are potentially carcinogenic and the process is time-consuming. Also, Schollenberger et al, U.S. Pat. No. 3,939,111 discloses use of ammonium salts of strong acids to stabilize polyurethane solution viscosity, but such salts are hygroscopic and the presence of water in the polymer solution can render the solution unsatisfactory for dry-spinning. Accordingly, a purpose of this invention is to provide polyurethaneurea solutions of constant viscosity, so that the solutions can be dry spun into spandex, without suffering the aforementioned shortcomings.

Lewis, U.S. Pat. No. 4,548,975 in Example 3, Comparison 9, and Kausch et al, U.S. Pat. No. 4,877,825, Comparison Example 13, each disclose a polyurethaneurea solution containing tetrakis-(2,4-di-t-butylphenyl)-4,4'-biphenylene diphosphonite in an amount that results in a 2% concentration of the phosphonite in dry-spun spandex. The disclosures concern protection of spandex against discoloration due to heat, combustion gases and light. However, in both references the phosphonite is employed in comparison samples that are shown to be inferior to the claimed stabilizers of the references. Furthermore, both references are silent on the problems of changes in polymer solution viscosity.

SUMMARY OF THE INVENTION

The present invention provides an improved solution of polyurethaneurea polymer in an inert organic solvent. According to the invention, the improved solution is protected against viscosity changes during storage and processing by the presence of a 4,4'-biphenylene diphosphonite additive in the solution. The additive amounts to 0.05 to 1.5 percent of the dry polymer weight and has the following structural formula

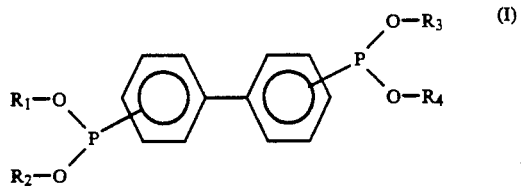

wherein
the biphenylene unit is unsubstituted or substituted,
$R_1$, $R_2$, $R_3$ and $R_4$, each independently is a mono-substituted, di-substituted or tri-substituted phenyl group or an alkyl group of 3 to 8 carbon atoms, and the substituents of the biphenylene or phenyl are lower alkyl of 1 to 4 carbon atoms.

Preferably, $R_1$, $R_2$, $R_3$ and $R_4$ are each t-butylphenyl and the biphenylene is unsubstituted. Tetrakis-(2,4-di-t-butylphenyl)-4,4'-biphenylenediphosphonite) is a preferred additive; N,N-dimethylacetamide, a preferred solvent; and 0.1 to 0.5%, based on the weight of the polyurethaneurea, a preferred additive concentration range.

The present invention also provides novel spandex filaments dry spun from the solution.

DETAILED DESCRIPTION OF PREFERRED EMBODIMENTS

The invention is further illustrated by the following description of preferred embodiments. These are included for the purposes of illustration and are not intended to limit the scope of the invention. The scope is defined by the claims below.

As used herein, the term "spandex" has its usual meaning; namely, filaments or fiber from a long chain synthetic polymer that comprises at least 85% by weight segmented polyurethane. The polymer chain contains two types of segments; (a) "soft" segments, which are long chain polyether, polyester, or polyether-ester segments and (b) "hard" segments, which are relatively short chain segments derived from the reaction of an isocyanate and a diamine chain extender. Usually, polyurethaneurea elastomers are prepared by "capping" hydroxyl-terminated soft segment precursors with organic diisocyanate and then chain-extending the resultant isocyanate-capped product with diamine.

Typical polyether soft segments include those derived from tetramethylene glycol, 3-methyl-1,5-pentane diol, tetrahydrofuran, 3-methyltetrahydrofuran, and the like, and copolymers thereof. Polyethers derived from tetramethylene glycol are preferred. Typical polyester soft segments include reaction products of (a) ethylene glycol, tetramethylene glycol, 2,2-dimethyl-1,3-propane diol and the like with (b) diacids, such as adipic acid, succinic acid, and the like. Soft segments also can be copolymers, such as polyetheresters formed from the typical polyethers and polyesters, or from polycarbonate diols, such as poly(pentane-1,5-carbonate) diol and poly(hexane-1,6-carbonate) diol, and the like.

Typical of the organic diisocyanates that are suited for preparing the polyurethaneureas of the solutions of the present invention are bis-(p-isocyanatophenyl)methane (MDI), tolylene diisocyanate (TDI), bis(4-isocyanatocyclohexyl)methane (PICM), hexamethylene diisocyanate, 3,3,5-trimethyl-5-methylenecyclohexyl diisocyanate, and the like. MDI is preferred.

Various diamines are suited for chain extending capped glycol to form polyurethaneurea, such as ethylene diamine, 1,3-cyclohexane diamine, 1,4-cyclohexane diamine, and the like. Chain terminators can be included in the reaction mix to help regulate the final molecular weight of the polyurethaneurea. Usually the chain terminators are monofunctional compounds having an active hydrogen, such as diethylamine.

Suitable solvents for the polyurethaneurea solutions of the present invention include N,N-dimethylacetamide (DMAc), dimethylformamide, dimethylsulfoxide and N-methyl pyrrolidone. DMAc is the most commonly used solvent. Polyurethaneurea concentrations in the range of 30 to 40%, especially 35 to 38% (by total weight of the solution) are particularly suited for dry spinning into filaments.

In accordance with the improvement of the present invention, polyurethaneurea solutions are protected against unwanted changes in solution viscosity by incorporating into the solution a small amount of an additive of the structural formula (I) above. As noted above, $R_1$, $R_2$, $R_3$ and $R_4$ are the same or different and each is a mono-, di-, or tri-substituted phenyl radical, the substituents being alkyl groups having 1 to 4 carbon atoms, preferably t-butyl. The central biphenylene group of the additive of Formula (I) is unsubstitiuted or substituted by lower alkyl of 1-4 carbon atoms, but preferably is not substituted. Thus, a particularly preferred additive is tetrakis-(2,4-di-t-butylphenyl)-4,4'-biphenylenediphosphonite. The preferred solvent is N,N-dimethylacetamide.

It is usually necessary to incorporate the phosphonite additive to fresh polyurethaneurea solution. Generally, the addition is made less than twelve hours, preferably less than four hours, and most preferably less than one-half hour after completion of the chain extension reaction that completes the formation of the polyurethaneurea. Addition of the phosphonite to substantially older polyurethaneurea solutions has little effect in preventing solution viscosity fluctuations.

The concentration of biphenylene diphosphonite additive in the polyurethaneurea solution is usually in the range of about 0.05 to 1.5% (based on dry weight of polyurethaneurea). At concentrations of less than about 0.05%, the additive usually is less effective in controlling solution viscosity fluctuations. At concentrations greater than about 1.5%, spandex dry spun from the solution can have undesirably high load power. In the preferred concentration range of 0.1 to 0.5% for the 4,4'-biphenylene diphosphonite additive (based on the dry weight of polyurethaneurea) changes in solution viscosity can be reduced by factors of two or more.

Biphenylene diphosphonite additives of the invention can be incorporated into the polyurethaneurea solutions by conventional techniques, much in the same way as other additives and stabilizers are incorporated. For example, the additive can be mixed with solvent, other additives, and optionally polymer solution, to form a concentrated solution or slurry, which is then mixed with polymer solution for spinning. Generally, the biphenylene diphosphonite additives of the solutions of the invention are soluble in conventional spandex solvents (e.g., DMAc and DMF).

Biphenylene diphosphonite additives useful in the solutions of the present invention can be prepared by the general techniques disclosed in Hofer et al, U.S. Pat. No. 4,075,163. Tetrakis-(2,4-di-t-butylphenyl)-4,4'-biphenylene diphosphonite, a preferred additive in accordance with the invention, is available commercially as Sandostab® P-EPQ (sold by Sandoz Chemicals Corp., Charlotte, N.C.).

Other conventional agents can be added to the polyurethaneurea solutions for specific purposes. For example, antioxidants, thermal stabilizers, UV-light stabilizers, pigments, dyes, titanium dioxide, lubricating agents, and the like, can be employed as long as such agents do not produce antagonistic effects with the phosphonite additive and polyurethaneurea solutions.

TEST PROCEDURES

The preceding discussion and examples below report several parameters, which are measured by the test procedures described in the following paragraphs.

Solution viscosity is determined in Examples I and II in accordance with the general method of ASTM D1343-69 with a Model DV-8 Falling Ball Viscometer (sold by Duratech Corp., Waynesboro, Va.), operated at 40° C.; in Example III with a Brookfield viscometer, operated at 23° C.

Strength and elastic properties of spandex dry spun from the polyurethaneurea solutions are measured in general accordance with the method of ASTM D2731-72 and as described in detail in Dreibelbis et al, U.S. Pat. No. 5,000,899, column 5, lines 8-25.

Percent wind-up stretch, $\%W_s$, is determined from the ratio of the speed of the the windup roll, $S_w$, to the speed of the first feed roll, $S_f$, by the formula $$\%W_s = 100[(S_w/S_f) - 1].$$

The invention is further illustrated by the following examples of preferred embodiments. These examples are included for the purposes of illustration and are not intended to limit the scope of the invention, which scope is defined by the appended claims. Unless indicated otherwise, all percentages are based on the total weight of the dry polyurethaneurea. Samples of the invention are designated with Arabic numerals; comparison samples with upper-case letters.

EXAMPLE I

This example demonstrates the advantageous reduction in variation of solution viscosity that is effected by the presence of a very small amount of a 4,4'-biphenylene diphosphonite additive according to the invention in a polyurethaneurea solution. The viscosity stability of a polyurethaneurea solution containing 0.25% (by weight of dry polyurethaneurea) of an additive in accordance with the invention is compared to that of an identical solution containing no such additive. The results show that this low concentration of additive reduced the viscosity range by a factor of 4.5.

A "capped glycol", having a 2.4% content of isocyanate moieties, was prepared from a 1.7:1 mole ratio of MDI and tetramethylene ether glycol, having a number average molecular weight of 2,000. The capped glycol was diluted with DMAc solvent and then chain extended with a 90/10 mole ratio mixture of ethylene diamine and 1,3-diaminocyclohexane. Diethylamine was added at a concentration of 45 milliequivalents per kg of polymer solids. Additional DMAc solvent was then added to adjust the polymer solids content to 37% by weight of the total solution.

About 25 minutes after the chain-extension reaction was performed, a group of stabilizers and other agents was added to the solution to provide (based on dry weight of the polyurethaneurea) 1.5% Cyanox® 1790 phenolic antioxidant (sold by American Cyanamid Corp.), 0.25% Sandostab® P-EPQ (a 4,4'-biphenylene diphosphonite of the present invention), 0.5% of DI-PAM/DM (a copolymer of diisopropylaminoethyl methacrylate and n-decyl methacrylate) and 0.6% silicone oil, along with solvent and polymer solution. The phosphonite is present at about 0.1% based on the weight of the total solution. The final solution (designated Sample 1) had a solids content of 38% (based on total weight of solution).

To simulate handling of such solutions in a spandex manufacturing facility, 25 kilograms of the solution were placed in a tank at room temperature (i.e., about 25° C.) and about 38 liters per minute were recirculated through a centrifugal pump operating at a pressure of about 600 psi (4130 kPa). A small amount of the recirculating polymer solution was removed at a constant rate and forwarded to a dry-spinning cell for conversion into spandex (i.e., filaments of the polyurethaneurea elastomer). The tank required refilling about every 2.5 hours. During the 2.5-hour period, the viscosity of the polymer solution increased from 4,200 to 4,850 poises.

The procedures of this example were repeated with the 4,4'-biphenylene diphosphonite additive omitted, to provide comparison Sample A. Subjecting Comparison Sample A to the 2.5-hour recirculation test (described in the preceding paragraph), resulted in a solution viscosity increase from 3,200 to 6,100 poises. This increase was more than 4.5 times greater than the increase experienced by the Sample 1, which contained the small concentration of phosphonite additive in accordance with the invention.

The solutions of Sample 1 and Comparison Sample A were dry spun into 20-denier monofilament yarns by conventional means and wound up at a speed of 480 meters/min. An additional solution, designated Sample 2, prepared by the procedures of this example with 0.50% Sandostab® P-EPQ, was also dry-spun into spandex in the same manner as Samples 1 and A. Table 1 summarizes selected physical properties of the yarns.

TABLE 1

| | (Example I) | | |
|---|---|---|---|
| | Comparison A | Of Invention 1 | 2 |
| % P-EPQ | 0.00 | 0.25 | 0.50 |
| Break Elongation, % | 584 | 590 | 592 |
| Load Power, gpd | | | |
| at 100% Elongation | 0.061 | 0.065 | 0.064 |
| at 200% Elongation | 0.12 | 0.13 | 0.13 |
| Power at Break, gpd | 1.10 | 1.09 | 1.10 |
| Wind-up Stretch, % | 26-32 | 18-22 | 22 |

Table 1 shows that at biphenylene diphosphonite concentrations of 0.5%, and probably at somewhat higher concentrations too (as shown in Example III, below) the physical properties of the resulting fibers were not detrimentally affected.

EXAMPLE II

This example further illustrates the effect of additive in accordance with the invention on reducing undesired variations in solution viscosity with time.

A "capped glycol", having a 2.4% content of isocyanate moieties, was prepared from a 1.6:1 mole ratio of MDI and tetramethylene ether glycol having a number average molecular weight of 1,800. The capped glycol was diluted with DMAc solvent and then chain extended and chain terminated as in Example I. Additional DMAc solvent was then added to adjust the polymer solids content to 37% by weight of the total solution.

Additives amounting to 0.75% Cyanox® 1790 antioxidant, 1.5% Sandostab® P-EPQ, 1.5% Tone® polyol (sold by Union Carbide Corp.), 2.0% DI-PAM/DM copolymer, and 0.6% silicone oil, were mixed with solvent and the polymer solution about 25 minutes after the polymer chain extension reaction. Percentages of ingredients are based on resulting dry fiber weight. The solids in the final solution amount to 38% of the total solution weight. A second identical solution was prepared, but with no 4,4'-biphenylene diphosphonite, and designated Comparison Sample B. Viscosity changes that occurred during storage of the two sample solutions are summarized in Table 2.

TABLE 2

| | (Example II) | |
|---|---|---|
| Time after chain extension, hours | Viscosity, poise | |
| | Sample 3 | Sample B |
| 0.5 | 3,260 | 2,930 |
| 12 | 3,330 | 2,760 |
| 20 | 3,330 | 3,460 |

An increase of 70 poises is within experimental error of being no observable increase in solution viscosity. Accordingly, Table 2 shows that the viscosity of solution protected by additive in accordance with the invention (Sample 3) is quite constant over the time period investigated. In contrast, viscosity fluctuations of Comparison Sample B over a range of 700 poises, is ten times greater than the viscosity range experienced by Sample 3. Fluctuations of 700 poise can cause spinning discontinuities.

The solutions of Sample 3 and Comparison Sample B were dry spun as in Example I into 20-denier monofilaments which had the following load powers:

| | Sample 3 | Comparison B |
|---|---|---|
| Load Power, grams/denier | | |
| at 100% extension | 0.14 | 0.11 |
| at 200% extension | 0.27 | 0.24 |

These results show that at a biphosphonite additive concentration of 1.5% (Sample 3), the load power of the spandex approaches a value which is considered to be close to the upper limit acceptability for satisfactory knitting of fabrics containing spandex. Excessive load power can cause rapid needle wear during knitting. These results also show that polymer solutions handled under relatively quiescent conditions undergo smaller viscosity changes than do solutions which are subjected to shearing or stirring (as in Example I above and Example III below).

EXAMPLE III

This example further illustrates the effects of biphenylene diphosphonite concentration on the viscosity stability of polyurethaneurea solutions. The unusual effectiveness of the preferred range of 0.1 to 0.5% for the additive concentration is demonstrated.

Six polyurethaneurea solutions were prepared, each with a different biphenylene diphosphonite concentration. For each sample, 500 grams of polymer solution were mixed with 14 grams of a DMAc solution that contained Sandostab® PEP-Q in an amount that resulted in the concentrations listed in Table 3, below. Comparison Sample C contained no Sandostab® PEP-Q. Samples 4-8 are of the invention. The solutions were placed in a beaker and stirred for 30 minutes with an electrically driven disk stirrer of 1.75-inch (4.4-cm) diameter, after which stirring was stopped for 30 minutes and the solution viscosity was measured. Stirring was then resumed at 20 rotations per minute for another 20 hours, after which the solution was undisturbed for another hour and a second viscosity measurement was made. Table 3 summarizes the measurements.

TABLE 3

(Example III)

| | Weight % additive | Viscosity (poise) | | |
|---|---|---|---|---|
| | | 1 hr | 22 hr | Change |
| Comparison Sample A | 0.00 | 5,000 | 6,500 | 1,500 |
| Of Invention | | | | |
| Sample 4 | 0.10 | 5,200 | 5,700 | 500 |
| Sample 5 | 0.25 | 5,100 | 5,900 | 800 |
| Sample 6 | 0.50 | 5,100 | 6,150 | 1,050 |
| Sample 7 | 0.75 | 4,900 | 6,000 | 1,100 |
| Sample 8 | 1.50 | 5,300 | 6,600 | 1,300 |

The data summarized in Table 3 clearly show the advantageous effect of the Sandostab® PEP-Q in reducing viscosity changes in polyurethaneurea polymer solutions. Surprisingly, the stabilization of the viscosity is most pronounced at the lower concentrations of the biphenylene diphosphonite additive; additive effectiveness apparently diminishes at the higher concentration and is greatest in a concentration range of 0.1 to 0.5%.

I claim:

1. An improved solution of polyurethaneurea polymer in an inert organic solvent, the improvement comprising, for protection against viscosity changes during storage and processing, a 4,4'-biphenylenediphosphonite additive incorporated in the solution, the additive amounting to 0.05 to 1.5 percent of the weight of the polymer and having the following structural formula

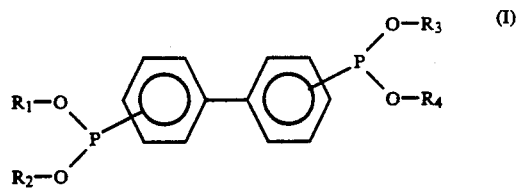

wherein
the biphenylene unit is unsubstituted or substituted,
$R_1$, $R_2$, $R_3$ and $R_4$, each independently is a mono-substituted, di-substituted or tri-substituted phenyl group or an alkyl group of 3 to 8 carbon atoms, and the substituents on the biphenylene or phenyl groups are lower alkyl of 1 to 4 carbon atoms.

2. A solution in accordance with claim 1, wherein the additive is tetrakis-(2,4-di-t-butylphenyl)-4,4'-biphenylenediphosphonite).

3. A solution in accordance with claim 2 wherein the solvent is N,N-dimethylacetamide, the concentration of the additive is in the range of 0.1 to 0.5%, based on the weight of the polyurethaneurea.

4. Spandex dry spun from a polyester-based polyurethaneurea or polyether-based polyurethaneurea solution of claim 1.

5. Spandex dry spun from a polyester-based polyurethaneurea or polyether-based polyurethaneurea solution of claim 2.

6. Spandex dry spun from a polyester-based polyurethaneurea or polyether-based polyurethaneurea solution of claim 3.

* * * * *